United States Patent
Cohen et al.

(10) Patent No.: US 9,536,006 B2
(45) Date of Patent: *Jan. 3, 2017

(54) ENRICHING SEARCH RESULTS (71) Applicant: Google Inc., Mountain View, CA (US)

(72) Inventors: Tal Cohen, Atlit (IL); Ziv Bar-Yossef, Herzliya (IL); Igor Tsvetkov, Maineville, OH (US); Tomer Kol, Yoqneam Illit (IL); Adi Mano, Haifa (IL); Oren Naim, Zichron Yaakov (IL); Nitsan Oz, Haifa (IL); Pravir Kumar Gupta, Mountain View, CA (US); Kavi J. Goel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,308

(22) Filed: Nov. 23, 2015

(65) Prior Publication Data

US 2016/0078137 A1 Mar. 17, 2016

Related U.S. Application Data

(63) Continuation of application No. 13/118,026, filed on May 27, 2011, now Pat. No. 9,208,230.

(60) Provisional application No. 61/408,533, filed on Oct. 29, 2010.

(51) Int. Cl.
*G06F 17/30* (2006.01)

(52) U.S. Cl.
CPC ..... *G06F 17/30867* (2013.01); *G06F 17/3053* (2013.01); *G06F 17/30528* (2013.01); *G06F 17/30554* (2013.01); *G06F 17/30864* (2013.01)

(58) Field of Classification Search
CPC ........... G06F 17/3053; G06F 17/30554; G06F 17/30864; G06F 17/30867
USPC ........................................................ 707/731
See application file for complete search history.

(56) References Cited

U.S. PATENT DOCUMENTS

| | | | |
|---|---|---|---|
| 6,961,723 B2 | 11/2005 | Faybishenko et al. | |
| 7,133,870 B1 | 11/2006 | Tripp et al. | |
| RE40,683 E * | 3/2009 | Perkins | G06F 17/3089 |
| 7,725,465 B2 | 5/2010 | Liao et al. | |
| 7,849,079 B2 | 12/2010 | Chandrasekar et al. | |

(Continued)

OTHER PUBLICATIONS

International Search Report and Written Opinion for PCT/US2011/58389 dated Mar. 29, 2012, 9 pages.

(Continued)

*Primary Examiner* — Mark E Hershley
(74) *Attorney, Agent, or Firm* — Fish & Richardson P.C.

(57) ABSTRACT

Methods, systems, and apparatus, including computer programs encoded on a computer storage medium, for enhancing search results. In one aspect, a method includes identifying a plurality of registered publishers for enriched search results and, for each registered publisher, obtaining enrichment information from the registered publisher and associating the enrichment information with a resource provided by the publisher. A query is received. A plurality of responsive resources that are responsive to the query are identified. A first responsive resource is determined to be associated with enrichment information. An enriched search result is provided, the enriched search result identifying the first responsive resource and including the first responsive resource's associated enrichment information.

20 Claims, 4 Drawing Sheets

(56) References Cited

U.S. PATENT DOCUMENTS

| | | | |
|---|---|---|---|
| 2003/0236856 A1* | 12/2003 | Bird | G06F 17/30864 709/217 |
| 2005/0256867 A1 | 11/2005 | Walther et al. | |
| 2007/0294615 A1* | 12/2007 | Sathe | G06F 17/30702 707/803 |
| 2008/0046312 A1* | 2/2008 | Shany | G06Q 30/02 705/14.26 |
| 2009/0125598 A1* | 5/2009 | Sun | H04L 12/5815 709/206 |
| 2009/0204753 A1 | 8/2009 | Bridge et al. | |
| 2009/0287677 A1* | 11/2009 | Markov | G06F 17/30905 |
| 2009/0327268 A1* | 12/2009 | Denney | G06F 17/30867 |
| 2010/0114925 A1* | 5/2010 | Shafer | G06F 17/30864 707/759 |
| 2010/0198812 A1* | 8/2010 | Athsani | G06F 17/30867 707/722 |
| 2010/0228710 A1* | 9/2010 | Imig | G06F 17/30867 707/706 |
| 2010/0235338 A1* | 9/2010 | Gabriel | G06F 17/3053 707/706 |
| 2010/0287170 A1* | 11/2010 | Liu | G06F 17/30696 707/759 |
| 2010/0299343 A1* | 11/2010 | Ahari | G06F 17/30702 707/759 |
| 2011/0055189 A1* | 3/2011 | Effrat | G06F 17/3064 707/706 |
| 2011/0161308 A1* | 6/2011 | Andersen | G06F 17/30867 707/707 |
| 2011/0252011 A1* | 10/2011 | Morris | H04L 12/185 707/706 |
| 2011/0264673 A1* | 10/2011 | White | G06F 17/30867 707/750 |
| 2011/0314011 A1* | 12/2011 | Buehrer | G06F 17/30864 707/728 |
| 2012/0059838 A1* | 3/2012 | Berntson | G06F 17/30864 707/759 |

OTHER PUBLICATIONS

International Search Report and Written Opinion for PCT/US2011/58389 dated Apr. 3, 2012, 8 pages.

Ahn et al., "Personalized web exploration with task models", Proceedings of the 17th International Conference on World Wide Web, Apr. 21-25, 2008, Beijing, China, <http://www.comp.leeds.ac.uk/umuas/reading-group/pl-ahnA.pdf>, 10 pages.

Authorized Officer Philippe Becamel, International Preliminary Report on Patentability for PCT/US2011/58389 dated May 10, 2013, 7 pages.

* cited by examiner

ENRICHING SEARCH RESULTS

CROSS-REFERENCE TO RELATED APPLICATIONS

This application is a continuation of U.S. patent application Ser. No. 13/118,026, entitled "Enriching Search Results," filed May 27, 2011, now allowed, which claims priority to U.S. Provisional Patent Application No. 61/408,533, entitled "Enriching Search Results," filed Oct. 29, 2010. Both of these patent applications are incorporated herein by reference in their entireties.

BACKGROUND

This specification relates to providing search results.

Internet search engines provide information about Internet accessible resources (e.g., web pages, images, text documents, multimedia content) that are responsive to a user's search query by returning a set of search results in response to the query. A search result includes, for example, a Uniform Resource Locator (URL) and a snippet of information for resources responsive to a query. Some web pages are designed to provide information to search engine indexers that index the pages. For example, some web pages include information in Hypertext Markup Language (HTML) meta tags for search engines to use in determining or presenting search results.

SUMMARY

A search system provides enriched search results. Each search result identifies a resource. The search system enriches a search result by presenting the search result with enrichment information obtained from a publisher of a resource identified by the search result. The search system obtains the enrichment information from registered publishers who provide the enrichment information according to a data model.

In general, one innovative aspect of the subject matter described in this specification can be embodied in methods that include the actions of identifying a plurality of registered publishers for enriched search results and, for each registered publisher, obtaining enrichment information from the registered publisher and associating the enrichment information with a resource provided by the publisher; receiving a query; identifying a plurality of responsive resources, a responsive resource being a resource that is responsive to the query; determining that a first responsive resource provided by a first registered publisher is associated with enrichment information obtained from the first registered publisher; and providing an enriched search result, the enriched search result identifying the first responsive resource and including the enrichment information associated with first responsive resource. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Determining that the first responsive resource is associated with enrichment information comprises: identifying responsive enrichment information, responsive enrichment information being enrichment information that is responsive to the query; and determining that the first responsive resource is associated with the responsive enrichment information. Identifying the responsive enrichment information is performed in parallel with identifying the responsive resources. Identifying the registered publishers comprises: indexing a registration resource for a first publisher and determining that the registration resource includes registration information, wherein the registration information includes a request to register for enriched search results. The registration information includes an enrichment information resource locator for the first publisher's enrichment information. Obtaining enrichment information from the registered publisher comprises obtaining the enrichment information from an enrichment information resource location distinct from a resource location for the resource. The actions further comprise: periodically re-indexing resources published by the registered publishers and resources provided by other publishers at a first frequency; and periodically re-obtaining enrichment information from the registered publishers at a second frequency more frequent than the first frequency. The actions further comprise refreshing the enrichment information associated with the first responsive resource.

Particular embodiments of the subject matter described in this specification can be implemented so as to realize one or more of the following advantages. Search results can be enriched with information that is more up-to-date than information stored in an index of resources, e.g., an index built by crawling the Internet. Search results can be enriched with information relevant to a particular query. Publishers can register to have search results for their resources be enriched by a search system. Search results can be enriched with information without explicitly parsing or matching the search query for the purpose of enriching the search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
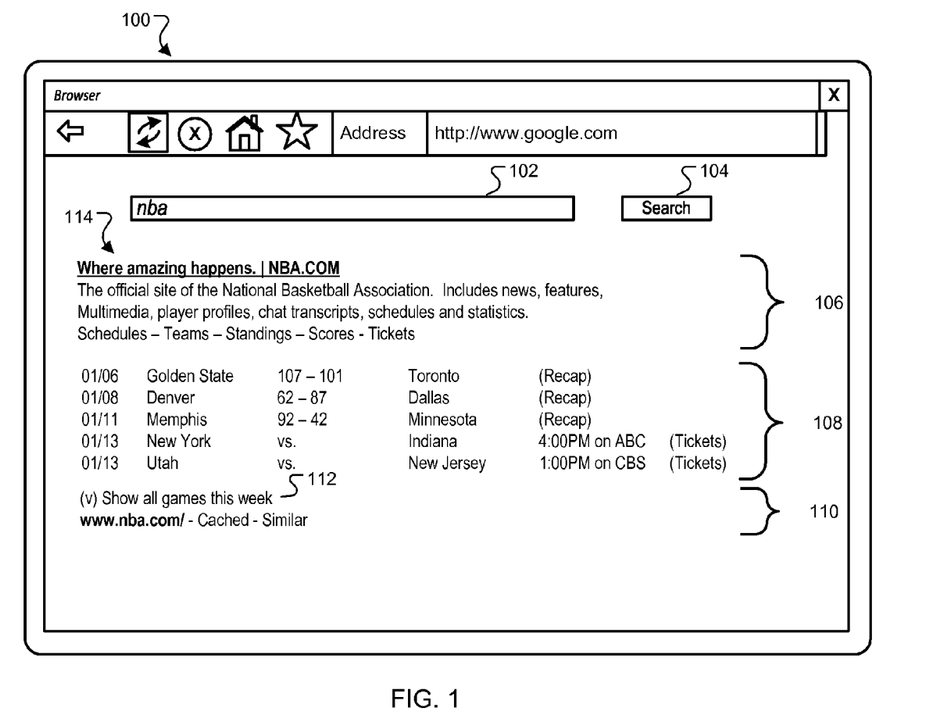
FIG. 1 illustrates a search user interface as displayed in an example graphical user interface (GUI) as presented in a web browser.

FIG. 1 illustrates a search user interface for a search system as displayed in an example graphical user interface (GUI) 100 as implemented in a web browser. The GUI 100 includes a text entry field 102, which accepts queries from users, and transmits them to a search engine when a search button 104 is selected. The search engine identifies resources (e.g., web pages) that are responsive to the query in an index of resources of the world wide web or other collection of resources and then transmits search results, generally in the form of a web page, to the web browser for presentation.

A resource in the context of this specification is any data that can be provided over a network and that is associated with a resource address, e.g., a Uniform Resource Locator (URL). Resources include Hypertext Markup Language (HTML) pages, word processing documents, portable document format (PDF) documents, electronic books, audio content, images, videos, electronic games, and feed sources.

FIG. 1 shows an example search result 114 for the query "nba." The search result 114 identifies a resource, the web page at "www.nba.com," for the National Basketball Association (NBA). The search result 114 is an example of an enriched search result. The search result 114 is enriched with information beyond a brief description of the resource.

The search result 114 is shown in three regions 106, 108, and 110 of the GUI 100. The first region 106 includes a title, a brief description of the web page, and links to other associated web pages. The second region 108 includes a table showing scheduled NBA games and, for games already played, scores of the games. The table also shows links to recaps of games already played, television networks and times for games not yet played, and links to web sites where one can purchase tickets for games not yet played. The search engine provides the data in the table using enrichment information provided by the NBA (e.g., from a server at www.nba.com). The third region 110 includes a control 112 that, when toggled by a user, causes the web browser to show more games in the table of the second region 108. The third region 110 also includes a link to the resource identified by the search result.

Other types of publishers will provide other types of enrichment information. For example, search results related to airlines flights may be enriched with live flight status information; search results related to athletes may be enriched with player statistics; search results related to weather may be enriched with local weather information; search results related to financial topics may be enriched with financial data; and search results related to television programs may be enriched with programming schedules.

Figure 2:
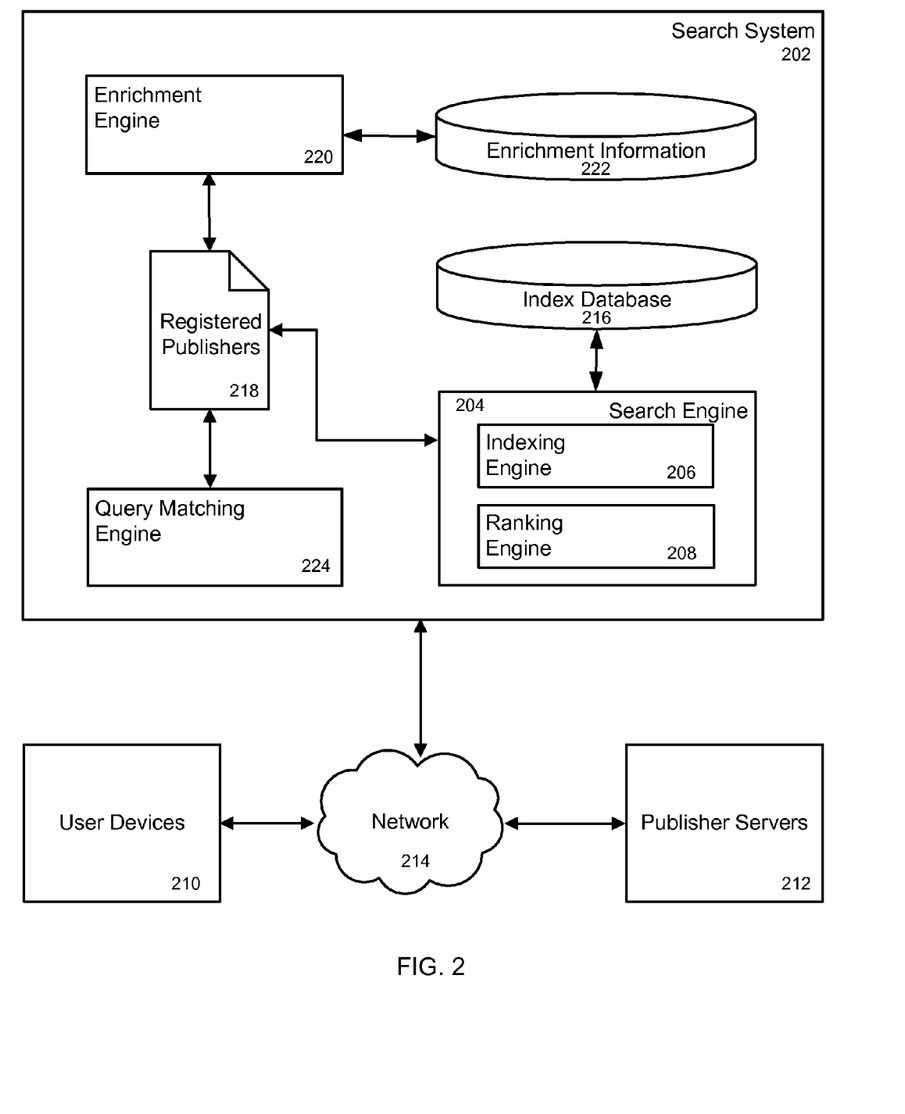
FIG. 2 is a block diagram of a search system that can provide enriched search results.

FIG. 2 is a block diagram of a search system 202 that can provide enriched search results. The search system 202 is implemented on one or more computers. The search system 202 communicates with client devices 210 and publisher servers 212 over a data communication network 214. A user can send search queries to the search system 202 using a user device 210, e.g., a personal computer or smart phone running a web browser. The search system 202 responds by sending search results to the user device 210, e.g., for presentation in a web browser.

A publisher server 212 is one or more computers that host and provide electronic access to a resource over the network 214. A publisher server 212 typically hosts a web site that is a collection of one or more resources associated with a domain name. An example web site is a collection of web pages formatted in hypertext markup language (HTML) that can contain text, graphic images, multimedia content, and programming elements, such as scripts.

The search system includes a search engine 204. The search engine 204 identifies resources relevant to queries. The search engine 204 includes an indexing engine that crawls the publisher servers 212 and indexes the resources provided by the publisher servers 212. The index information is stored in an index database 216. In general, the index database 216 can include various types of indexes for resources, including keyword-based indexes, location-based indexes, and other indexes. The search engine 204 also includes a ranking engine 208 that ranks resources, e.g., by quality, by relevancy to a query, or both.

The search system 202 provides enriched search results for some resources provided by registered publishers. Registered publishers are publishers that are registered with the search system 202 to provide enriched search results. The search system 202 stores registration information for registered publishers in a registered publishers database 218. The registration information for a registered publisher includes, for example, a domain name, a list of resources from the publisher for which enriched search results should be provided (e.g., a list of web pages), information specifying what kind of enrichment information should be added to search results (e.g., the number of rows and columns in a table, or whether graphics or text should be added), and a resource locator for enrichment information to be added to search results (e.g., a URL of a feed source providing enrichment information). The enrichment information specified to be added to search results can be subject to limitations by the search system 202 to prevent a search result from using too much space on a results page. For example, the search system 202 may display only a certain number of lines of text or rows in a table.

The search system 202 can add registration information to the registered publishers database 218 in various ways. In some implementations, publishers include registration information on a web page, e.g., in metadata for a home page for a domain. The indexing engine 206 crawls the web page and determines that the web page indicates that the publisher is requesting to be registered. The indexing engine 206 adds the registration information to the registered publishers database 218. In some implementations, publishers register with the search system 202 using a registration web page. A person associated with a publisher can enter the publisher's registration information at the registration web page. In some implementations, a person associated with the publisher can provide the registration information to a system administrator for the search system 202. The system administrator adds the registration information to the registration information database 218. In some implementations, the search engine registers publishers without any explicit registration action from the publishers. For example, the search engine may determine that certain information on a web site is frequently updated and then register the publisher of the web site so that some of the frequently updated information is used to enrich search results for the web site.

An enrichment engine 220 stores enrichment information in an enrichment information database 222. Enrichment information is information used to enhance a search result. An example of enrichment information is the information displayed in the second region 108 of the GUI 100 in FIG. 1 (sports scores and schedules). Other examples of enrichment information include flight status information, weather data, and financial data. Enrichment information is associated with a resource from a publisher. Table 1 illustrates example descriptions of enrichment information associated with three example resources (web pages in this example) from an example publisher (the NBA).

TABLE 1

| Publisher | Resource | Description of Example Enrichment Information |
|---|---|---|
| NBA (domain: nba.com) | nba.com/home | Scores for most popular games |
| | nba.com/example_team | Schedule for example team |
| | nba.com/example_player | Statistics for example player |

The enrichment engine 220 obtains the enrichment information from the registered publishers. The enrichment engine 220 uses the registration information in the registered publishers database 218 to determine resource locators for enrichment information. For example, the resource locator may be a URL for a feed provided by a publisher.

In some implementations, the enrichment engine 220 interprets the enrichment information according to a data model. Use of a data model allows a variety of publishers to provide various types of enrichment information for resources. The data model is provided by (or for) the search system to publishers. Thus, a publisher can add registration information to one of its resources so that the indexing engine 206 registers the publisher, and then the publisher can provide enrichment information in a feed according to the data model and the enrichment engine 220 obtains it and stores it in the enrichment information database 222. The data model defines, for example, how to specify a table to include with a search result for a resource, how to define data to display in a table, how to identify images to include with a search result for a resource, and a period of time for which the enrichment information typically stays fresh.

In some implementations, the enrichment engine 220 periodically refreshes the enrichment information in the enrichment information database 222 by re-obtaining the enrichment information. The refresh period can be different for different publishers and different resources of a publisher. In some implementations, the enrichment engine 220 refreshes the enrichment information more frequently than the indexing engine 206 re-crawls resources for the index database 216. In those implementations, the information in the enrichment information database 222 is typically more up-to-date than information in the index database 216.

In some implementations, the enrichment engine 220 refreshes the enrichment information according to a publish/subscribe model. For example, the enrichment engine 220 may be notified by the publisher when updated enrichment information is available; the enrichment engine 220 can then refresh the enrichment information after receiving the notification. A publisher's notification to the enrichment engine 220 optionally includes the updated enrichment information so that the enrichment engine 220 does not have to fetch the updated enrichment information from a publisher's server. In some cases, the enrichment engine 220 receives notifications from services distinct from the publisher. For example, the enrichment engine 220 may receive notifications from a service that regularly scans a publisher's website, e.g., at a high frequency.

In some implementations, the search system 202 includes a query matching engine 224. The query matching engine 224 determines whether a query is relevant to any of the registered publishers, the registered publishers' resources, or any stored enrichment information. For example, the query matching engine 224 may search the enrichment information database 222 for information relevant to a query. In another example, the query matching engine 224 may search registration information in the registered publishers database 218 for information relevant to a query. The query matching engine 224 may perform matching, for example, by searching for certain text fragments, keywords, and regular expressions in the query or in synonyms of the query and then referring to a table, or by searching for keywords of the query in a repository of keywords.

Figure 3:
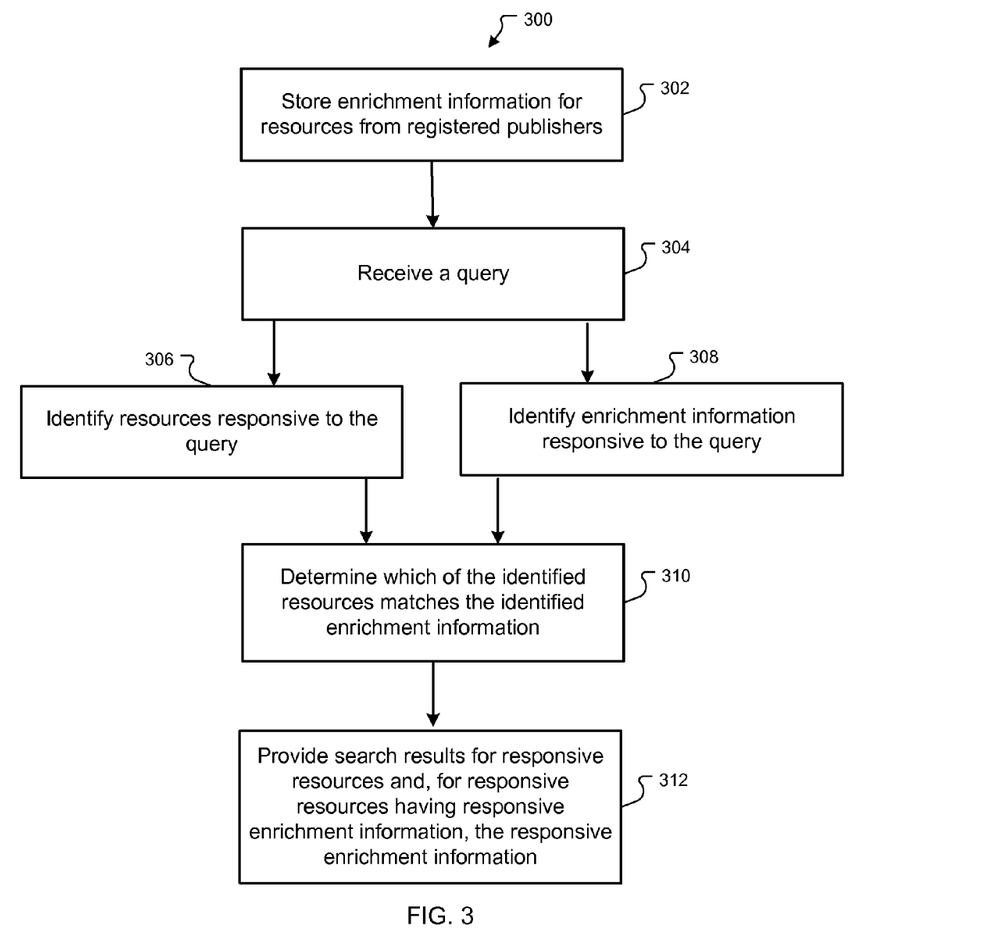
FIG. 3 is a flow diagram of an example process for providing enriched search results.

FIG. 3 is a flow diagram of an example process 300 for providing enriched search results. In some implementations, a system of one or more computers performs the process 300. For example, the search system 202 of FIG. 2 may perform the process 300. For convenience, the process will be described with respect to a system that performs the process 300.

The system stores enrichment information for resources from registered publishers (step 302). The publishers register by providing registration information, e.g., as described above with reference to FIG. 2. The registered publishers provide resource locators for enrichment information, e.g., to feed sources of enrichment information. The system uses the resource locators to obtain and store the enrichment information. The system stores data associating the enrichment information with resources from the registered publishers.

The system receives a query (step 304). For example, the query may be from a user operating a program on a user device, e.g., one of the user devices 210 of FIG. 2.

The system identifies resources responsive to the query (step 306). The system identifies responsive resources, for example, using conventional search techniques that identify responsive resources and provide search results that each refer to a responsive resource. The system also identifies enrichment information responsive to the query (step 308). In some implementations, the system identifies responsive resources and responsive enrichment information in parallel. For example, the system may execute the query matching engine 224 of FIG. 2 and the search engine 204 of FIG. 2 in parallel (e.g., on different computers).

In some implementations, the system identifies enrichment information responsive to the query while performing a process that identifies answer boxes to present with search results. An answer box is a formatted presentation of a particular type of content that is relevant to the query. For example, if the query refers to weather in a particular location, a weather answer box can include a forecast of weather in the particular location. By identifying an answer box relevant to the query, the system identifies enrichment information (the information displayed in the answer box) responsive to the query.

By identifying enrichment information responsive to the query, the system can identify enrichment information that is relevant to a user submitting the query. For example, consider the query "American Airlines flight 123." Enrichment information for that query may include the live status of that flight, e.g., the most recent status obtained and stored by the system. However, for the query "tomorrow's flight aa 123," enrichment information for that query may include data about delays from tomorrow's flight rather than the live status of the flight.

The system determines which of the identified resources, if any, matches the identified enrichment information (step 310). For example, the system may compare the responsive resources to the resources associated with the responsive enrichment information, and then determine that matching resources have responsive enrichment information. In some cases, none of the responsive resources will have responsive enrichment information. In those cases, the system can select one of three alternative actions: provide some responsive enrichment information even though it is not associated with a responsive resource; discard the responsive enrichment information; or add a resource associated with responsive enrichment information to the set of responsive resources.

In some implementations, the system refreshes the responsive enrichment information prior to providing search results. For example, for a responsive resource having responsive enrichment information, the system may obtain the responsive enrichment information from the publisher prior to providing search results. By doing so, the system obtains up-to-date enrichment information.

The system provides search results for the query. The search results identify the responsive resources. For example, if the query is from a user operating a web browser on a device, the system sends the search results in a web page to the device for presentation in the web browser. The search results include enriched search results for any resource having responsive enrichment information. The enriched search results include the responsive enrichment information.

Figure 4:
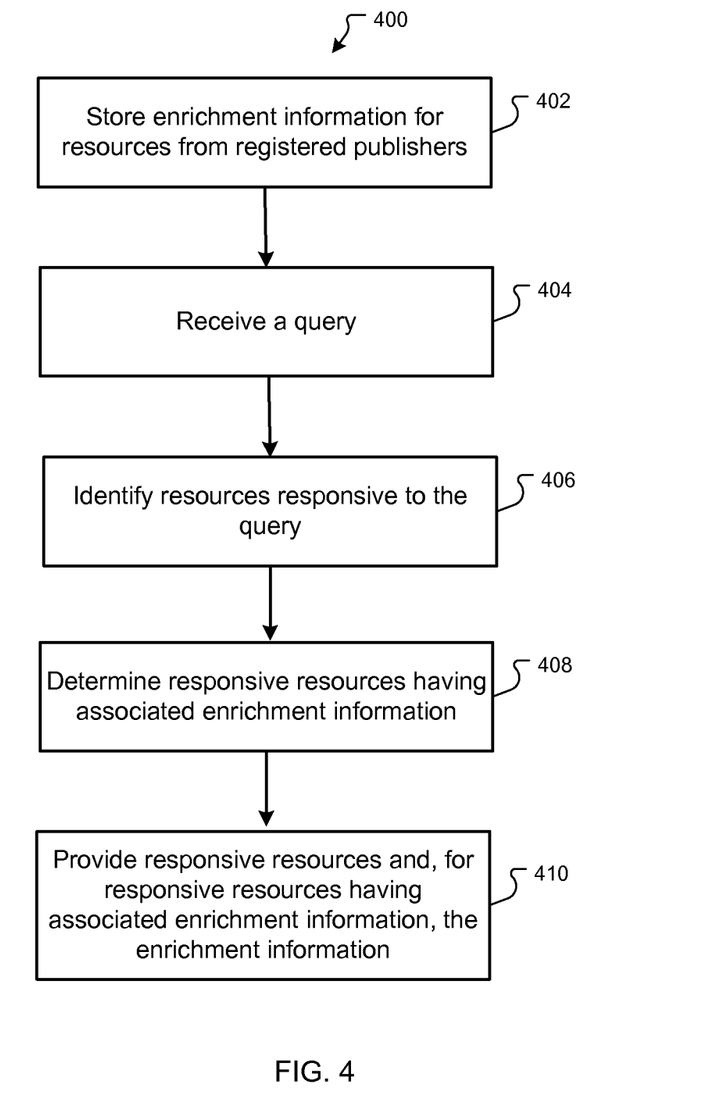
FIG. 4 is a flow diagram of an example process for providing enriched search results.

FIG. 4 is a flow diagram of an example process 400 for providing enriched search results. In some implementations, a system of one or more computers performs the process 400. For example, the search system 202 of FIG. 2 may perform the process 400. For convenience, the process will be described with respect to a system that performs the process 400.

The system stores enrichment information for resources from registered publishers (step 402). The system associates the stored enrichment information with resources. The system receives a query (step 404). The system identifies resources responsive to the query (step 406).

The system determines which, if any, of the responsive resources has associated enrichment information (step 408). For example, the system may compare the responsive resources to a list of all the resources for registered publishers having associated enrichment information after identifying the responsive resources. The system provides search results for the query that identify the responsive resources, including enriched search results for any resource having associated enrichment information (step 410). In some implementations, the system refreshes the associated enrichment information prior to providing search results.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   obtaining, by a search engine system, respective registration information from each of a plurality of publishers, the registration information including a location of respective enrichment information to be added to search results identifying resources provided by the respective publisher, each of the publishers being publishers registered with the search engine system;
   storing the registration information from the plurality of publishers for later use by the search engine system;
   receiving, by the search engine system, a query from a user;
   identifying, by the search engine system, a plurality of responsive resources, the plurality of responsive resources including a first responsive resource;
   determining, by the search engine system, that the first responsive resource is a resource for a first publisher that is associated with enrichment information;
   obtaining first enrichment information from the location of respective enrichment information included in the registration information provided by the first publisher to the search engine system; and
   providing, by the search engine system, in a response to the query, an enriched search result that identifies the first responsive resource and includes the first enrichment information.

2. The method of claim 1, wherein determining that the first responsive resource is associated with enrichment information comprises:
   identifying responsive enrichment information, responsive enrichment information being enrichment information that is responsive to the query; and
   determining that the first responsive resource is associated with the responsive enrichment information.

3. The method of claim 2, wherein identifying the responsive enrichment information is performed in parallel with identifying the responsive resources.

4. The method of claim 1, wherein providing the enrichment information comprises obtaining the enrichment information from an enrichment information resource location distinct from a resource location for the first responsive resource.

5. The method of claim 1, further comprising:
   periodically re-indexing resources published by registered publishers and resources provided by other publishers at a first frequency; and
   periodically re-obtaining enrichment information from the registered publishers at a second frequency more frequent than the first frequency.

6. The method of claim 1, further comprising refreshing the enrichment information associated with the first responsive resource.

7. The method of claim 1, wherein obtaining the query comprises receiving the query from a user device, and wherein providing the enriched search result comprises sending a document including the enriched search result to the user device.

8. A system comprising one or more computers configured to perform operations comprising:
   obtaining, by a search engine system, respective registration information from each of a plurality of publishers, the registration information including a location of respective enrichment information to be added to search results identifying resources provided by the respective publisher, each of the publishers being publishers registered with the search engine system;
   storing the registration information from the plurality of publishers for later use by the search engine system;
   receiving, by the search engine system, a query from a user;
   identifying, by the search engine system, a plurality of responsive resources, the plurality of responsive resources including a first responsive resource;
   determining, by the search engine system, that the first responsive resource is a resource for a first publisher that is associated with enrichment information;
   obtaining first enrichment information from the location of respective enrichment information included in the registration information provided by the first publisher to the search engine system; and
   providing, by the search engine system, in a response to the query, an enriched search result that identifies the first responsive resource and includes the first enrichment information.

9. The system of claim 8, wherein determining that the first responsive resource is associated with enrichment information comprises:
   identifying responsive enrichment information, responsive enrichment information being enrichment information that is responsive to the query; and
   determining that the first responsive resource is associated with the responsive enrichment information.

10. The system of claim 9, wherein identifying the responsive enrichment information is performed in parallel with identifying the responsive resources.

11. The system of claim 8, wherein providing the enrichment information comprises obtaining the enrichment information from an enrichment information resource location distinct from a resource location for the first responsive resource.

12. The system of claim 8, further comprising:
   periodically re-indexing resources published by registered publishers and resources provided by other publishers at a first frequency; and
   periodically re-obtaining enrichment information from the registered publishers at a second frequency more frequent than the first frequency.

13. The system of claim 8, further comprising: refreshing the enrichment information associated with the first responsive resource.

14. The system of claim 8, wherein obtaining the query comprises receiving the query from a user device, and wherein providing the enriched search result comprises sending a document including the enriched search result to the user device.

15. A computer storage medium encoded with a computer program, the program comprising instructions that when executed by one or more computers cause the one or more computers to perform operations comprising:
   obtaining, by a search engine system, respective registration information from each of a plurality of publishers, the registration information including a location of respective enrichment information to be added to search results identifying resources provided by the respective publisher, each of the publishers being publishers registered with the search engine system;
   storing the registration information from the plurality of publishers for later use by the search engine system;
   receiving, by the search engine system, a query from a user;
   identifying, by the search engine system, a plurality of responsive resources, the plurality of responsive resources including a first responsive resource;
   determining, by the search engine system, that the first responsive resource is a resource for a first publisher that is associated with enrichment information;
   obtaining first enrichment information from the location of respective enrichment information included in the registration information provided by the first publisher to the search engine system; and
   providing, by the search engine system, in a response to the query, an enriched search result that identifies the first responsive resource and includes the first enrichment information.

16. The computer storage medium of claim 15, wherein determining that the first responsive resource is associated with enrichment information comprises:
   identifying responsive enrichment information, responsive enrichment information being enrichment information that is responsive to the query; and
   determining that the first responsive resource is associated with the responsive enrichment information.

17. The computer storage medium of claim 16, wherein identifying the responsive enrichment information is performed in parallel with identifying the responsive resources.

18. The computer storage medium of claim 15, wherein providing the enrichment information comprises obtaining the enrichment information from an enrichment information resource location distinct from a resource location for the first responsive resource.

19. The computer storage medium of claim 15, the operations further comprising:
   periodically re-indexing resources published by registered publishers and resources provided by other publishers at a first frequency; and
   periodically re-obtaining enrichment information from the registered publishers at a second frequency more frequent than the first frequency.

20. The computer storage medium of claim 15, the operations further comprising refreshing the enrichment information associated with the first responsive resource.

* * * * *